Figure 1:
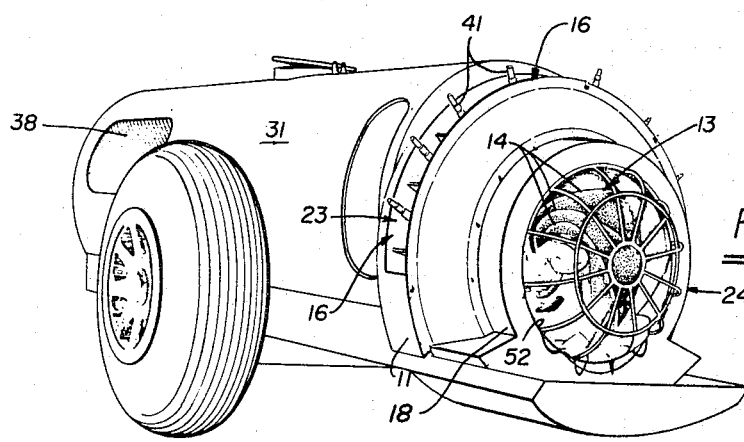
Figure 2:
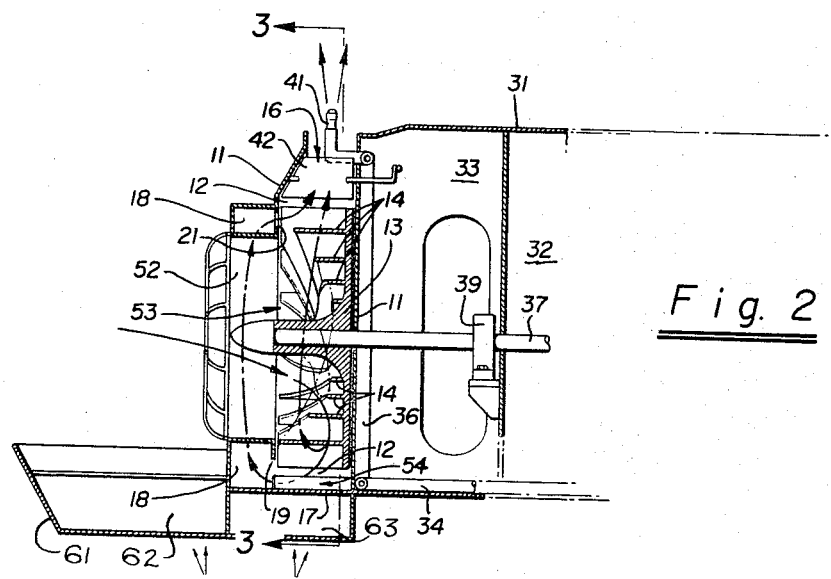
Figure 3:
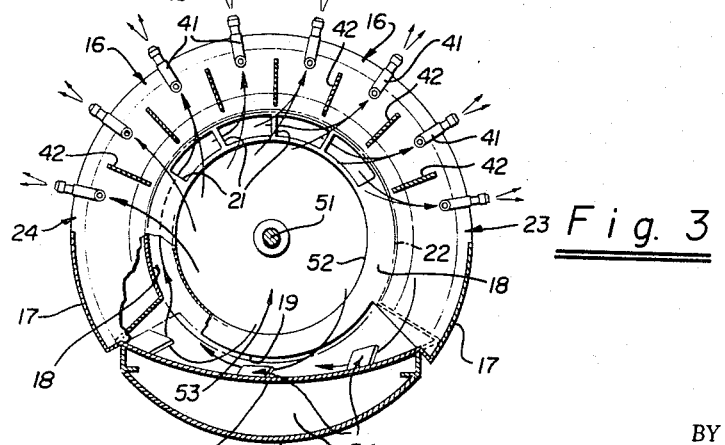

INVENTOR.
Sandy S. Sorrenti

United States Patent Office 3,335,943
Patented Aug. 15, 1967

3,335,943
CENTRIFUGAL BLOWERS FOR AGRICULTURAL SPRAYERS
Sandy S. Sorrenti, P.O. Box 334, Rte. 3, Escalon, Calif. 95320
Filed Feb. 7, 1966, Ser. No. 525,466
5 Claims. (Cl. 230—127)

This invention relates generally to centrifugal blowers for agricultural sprayers and, more particularly, relates to blowers for agricultural spraying devices which have a portion of their periphery blocked for controlled discharge of air and dispersion of spray materials.

In conventional agricultural spraying apparatus a centrifugal blower is employed to radially discharge air past spray nozzles which introduce finely divided material into the air blast. For most operations, however, it is desirable to control or preferentially select the peripheral segment over which the centrifugal air blast is directed. For example, when spraying trees a substantial portion of the blower discharge periphery which is directed towards the ground may be closed and spraying not conducted in that direction. Similarly, when spraying plants such as cotton, a substantial portion of the upper periphery of the blower may be closed. Closing a portion of the centrifugal blower periphery has, however, not been accomplished without attendant disadvantages including the loss of blower efficiency, reduced air volume through the blower, and an unbalance in the air velocity adjacent the closed portion of the periphery.

It is, therefore, an object of the present invention to provide a centrifugal blower for an agricultural sprayer which allows a peripheral control of air discharge while substantially maintaining blower efficiency and increasing and balancing discharge velocity and volume on the discharge portion of the blower.

Another object of the present invention is to provide a centrifugal blower for an agricultural sprayer in which second stage centrifugal acceleration of the blocked portion of the blower discharge is achieved.

Still another object of the present invention is to provide a centrifugal blower for an agricultural sprayer which is more compact and is easy and inexpensive to manufacture.

The invention possesses other objects and features of advantage some of which of the foregoing will be set forth in the following description of the preferred from of the invention which is illustrated in the drawing accompanying and forming part of the specification. It is to be understood, however, that varations in the showing made by said drawing and the description may be adopted within the scope of the invention as set forth in the claims.

Referring to said drawing (one sheet):

FIGURE 1 is a side perspective view of a centrifugal blower for an agricultural sprayer constructed in accordance with the present invention.

FIGURE 2 is a fragmentary side elevational view in cross-section of the centrifugal blower.

FIGURE 3 is an end cross-section partially broken away taken on the line 3—3 of FIGURE 2 with the blower impeller removed.

The centrifugal blower of the present invention comprises, briefly, an impeller housing 11 providing an impeller chamber 12 and an impeller 13 mounted for rotation therein and formed with impeller blades 14 for centrifugal displacement of air therefrom, the housing 11 being formed with centrifugally spaced open and closed peripheral portions 16 and 17 respectively providing a peripherally controlled air discharge from the open portion 16 and an air conduit means 18 connected to the housing 11 and having an air inlet port 19 at the closed peripheral portion 17 and an air discharge port 21 at a portion of the chamber 12 internally of the periphery 22 of the blades 14 and circumferentially related to the open portion 16 whereby entrapped air will be fed from the closed portion 17 to the blades 14 to provide a second stage centrifugal acceleration thereof from the the open portion 16.

The impeller 13, as seen in FIGURE 1, rotates in a counterclockwise direction. If it were not for the air conduit means 18, the closed peripheral portion 17 would cause the air discharge velocity and volume at the end 23 of the open portion adjacent the closed portion 17 to be relatively low and the corresponding velocity and volume on the opposite end of the open portion 24 to be inordinately high. This results from the trapping of air in the closed portion and the attendant pressure build-up and impeller blade construction and direction of rotation. The blower construction of the present invention not only eliminates this uneven pattern resulting from the blocking of a portion of the blower periphery but also utilizes the entrapped air by recirculating it for discharge from an open portion of the blower to thereby maintain the total efficiency of the blower and volume of air moved thereby to be substantially the same as it would be if no portion of the periphery were blocked. In addition, and most importantly, the volume of air moved and the resulting air discharge velocity is maximized by recirculating the air and discharging the recirculated air into the blades 13 of the impeller so that the recirculated air is given a second stage boost or acceleration by the impeller blades.

The sprayer of the present invention is constructed with a sprayer housing 31 defining a material storing chamber 32 and manifold chamber 33. Extending from the material chamber 32 and into the manifold chamber 33, is a distribution pipe 34 which terminates in a toroidally-shaped manifold 36. An impeller shaft 37 extends through both chambers 32 and 33 to provide a driving connection with the impeller motor which is located in the front end 38 of the sprayer. Supporting the shaft 37 and impeller 13 for rotation is a bearing 39 mounted in the manifold chamber 33. The manifold 36 distributes the spray material to a plurality of spray heads 41 which extend from the manifold chamber into the impeller chamber 12 and then radially in the direction of centrifugal discharge of the air from the impeller in the open portion 16. As thus constructed, spray materials in the chamber 32 are distributed through the manifold 36 to the spray heads 41 where they are aspirated and distributed by the discharge air blast past the radial spray heads. Also mountel in the impeller chamber 12 in order to angularly control the discharge of air are a plurality of angularly adjustable vanes 42.

As will be understood, it is possible to position the air discharge port 21 at a radial angle such that the air discharged therefrom is picked up by the impeller blades 14 at a position within the closed portion 17 of the chamber but is not discharged until the impeller blades have moved the air through an angle which allows radial discharge out the open portion 16 of the chamber. The exact location will depend upon such factors as impeller velocity and the radial location of the discharge port within the periphery of the blades 14. While various circumferentially related positions of the discharge port 21 and the open portion 16 are suitable, it is preferable to position the discharge port or ports 21 within a sector defined by the open portion 16 and the axis 51 of rotation of the impeller 13, which can most clearly be seen in FIGURE 3. The ports 21 will still fall within the periphery 22 of the impeller blades to achieve the boosting effect by discharge into the blades rather than exteriorly of them.

As a further feature of the centrifugal blower of the present invention to achieve radial compactness of blower construction and efficiency in recycling and second stage boosting of air, the conduit means 18 is of toroidal form of box-shaped open rectangular cross-section and is positioned parallel to the plane of rotation of the impeller 13 and axially adjacent the chamber 12. As so positioned, the toroidal conduit means 18 and more particularly the inner peripheral wall 52 surrounds and defines an axial inlet 53 to the impeller 13. Thus, the axial displacement and toroidal form of the conduit means 18 allows a blower construction which is radially as compact as if there were no second stage regeneration and yet is suitable for discharge of air directly into the impeller blades 14.

The agricultural sprayer of the present invention is preferably provided with a shielding structure 61 to prevent the suction of the impeller 13 from picking up leaves and papers and pulling them into the blades. The shield 61, as illustrated in the drawing, defines chambers 62 and 63 which are not a part of the conduit means 18.

In order to maximize the efficiency of transfer of the entrapped air from the closed portion 17 to open portion 16 through the axially displaced conduit means 18, the closed portion 17 is provided with deflector means 54 formed to axially deflect trapped air into the conduit inlet port 19. Means 54 here consists of a plurality of circumferentially spaced vanes canted to the vertical and longitudinal axes of the sprayer and thus into the air flow so as to guide and direct such flow into the intake 19 of the toroidal conduit 18.

It is an additional feature of the present invention, in order to maximize the efficiency with which air is recirculated from the closed portion of the blower, to position the discharge port 21 immediately adjacent the blades 14 so that the high velocity of the blades, particularly at the periphery thereof, causes a substantial venturi or suction effect at the port 21 which combines with the high pressure in the closed portion 17 resulting in improved movement of the air. This double action movement of air through the conduit 18 also results in a more uniform discharge of air out of the multiplicity of discharge ports 21. Thus, preferential discharge out of the nearest port 21 is avoided and the recirculated air is distributed relatively evenly over a substantial segment of the periphery providing a balanced centrifugal blower.

I claim:

1. A centrifugal blower for an agricultural sprayer comprising, an impeller housing providing an impeller chamber and an impeller mounted for rotation therein and formed with impeller blades for centrifugal displacement of air therefrom, said housing being formed with circumferentially spaced open and closed peripheral portions providing a peripherally controlled air discharge from said open portion, and air conduit means connected to said housing and having an air inlet port at said closed peripheral portion and an air discharge port at a portion of said chamber internally of the periphery of said blades and circumferentially related to said open blades and circumferentially related to said open portion whereby entrapped air will be fed from said closed portion to said blades to provide a second stage centrifugal acceleration thereof from said open portion.

2. A centrifugal blower as defined in claim 1, wherein said discharge port is positioned within a sector defined by said open portion of the axis of rotation of said impeller.

3. A centrifugal blower as defined in claim 2, wherein said discharge port is positioned immediately adjacent the said blades.

4. A centrifugal blower as defined in claim 2, wherein said conduit means is of toroidal form and is positioned parallel to the plane of rotation of said impeller and axially adjacent said chamber and surrounds and defines an axial air inlet opening to said impeller.

5. A centrifugal blower as defined in claim 4, and deflector means positioned in said closed portion and formed to axially deflect trapped air into said conduit inlet port.

References Cited

UNITED STATES PATENTS

| | | | |
|---|---|---|---|
| 2,620,230 | 12/1952 | Hait | 239—78 |
| 2,641,504 | 6/1953 | Robinson | 239—78 |
| 2,761,731 | 9/1956 | Fish | 239—78 |

ROBERT M. WALKER, *Primary Examiner.*

HENRY F. RADUAZO, *Examiner.*